Figure 1:
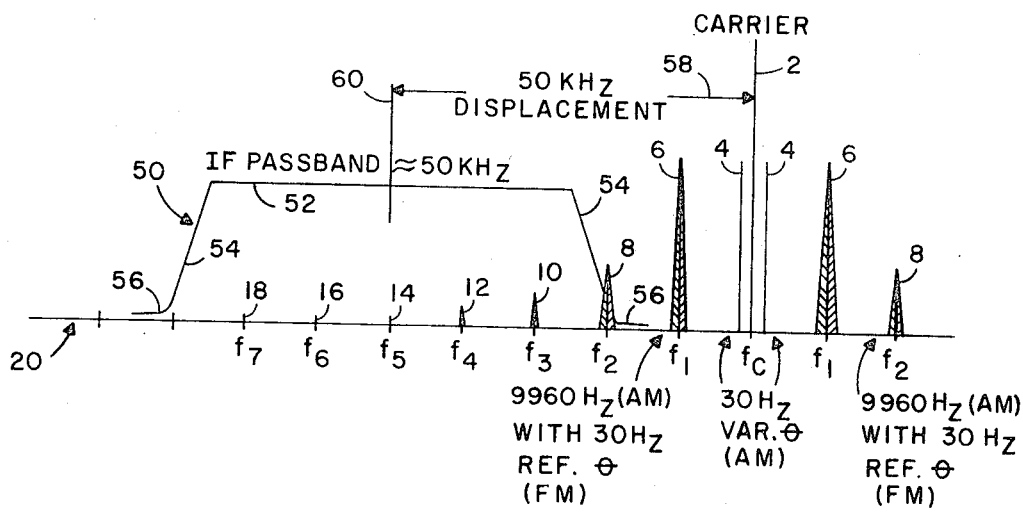

United States Patent [15] 3,665,470
Hemme [45] May 23, 1972

[54] MISTLINED VOR RECEIVER ALARM

[72] Inventor: William R. Hemme, Marion, Iowa

[73] Assignee: Collins Radio Company, Cedar Rapids, Iowa

[22] Filed: Aug. 7, 1970

[21] Appl. No.: 61,954

[52] U.S. Cl. ..........................343/106 R, 325/364, 325/455
[51] Int. Cl. ..........................................................G01s 1/50
[58] Field of Search........................325/364, 455; 343/106 R

[56] References Cited

UNITED STATES PATENTS 3,142,062  7/1964  Held..................................343/106 R
3,396,395  8/1968  Ball et al. ..........................343/113 R Primary Examiner—Benjamin A. Borchelt
Assistant Examiner—Richard E. Berger
Attorney—Robert M. Sperry and Robert J. Crawford

[57] ABSTRACT

This invention relates to methods and apparatus for monitoring a frequency outside the standard VOR modulation spectrum to prevent reception of false information when a VOR receiver has been mistuned 50 kHz from the transmitting frequency of a desired ground station, and there is no actual ground station transmitting on the wrongly selected frequency.

9 Claims, 2 Drawing Figures

INVENTOR.
WILLIAM R. HEMME
BY Robert M. Sperry
ATTORNEY

MISTUNED VOR RECEIVER ALARM

This invention relates to radio navigation and is particularly directed to methods and apparatus for preventing receipt of erroneous bearing information resulting from improper tuning of the VOR receiver.

The transmitting frequencies of VOR ground stations were originally established with 100 kHz separation. However, the VOR system of radio navigation has proven so satisfactory, and the demand for additional VOR ground stations has been so great, that the appropriate government agencies have, recently, authorized the establishment of several hundred additional VOR ground stations having frequency spacings of only 50 kHz. In doing so, the FAA has issued specifications requiring that airborne VOR receivers be capable of clearly distinguishing between a selected VOR ground station and a non-selected ground station transmitting on a frequency spaced 50 kHz from the frequency of the selected station. In general, the manufacturers of airborne VOR receivers have complied with this requirement. Moreover, the FAA generally assigns frequencies to the VOR ground stations on a geographic basis intended to minimize the occurrence of ground stations having adjacent frequencies. Consequently, this problem has not been significant. On the other hand, a serious problem has been found to occur in situations where a pilot inadvertently mistunes his airborne VOR receiver 50 kHz off of the frequency of a desired VOR ground station, so that there is no "on-channel" ground station. In this case, the modulation harmonic frequencies transmitted by the desired ground station will often be detected by the airborne VOR receiver with sufficient magnitude to cause the flag monitor circuits to indicate receipt of a valid signal and, in fact, the identification code of the desired ground station will actually be audible. However, the bearing indication will be completely false. Hence, the pilot "flying the needle," or relying on an automatic flight system, may be led a considerable distance off-course before discovering the error.

These disadvantages of prior art VOR receivers are overcome with the present invention and methods and apparatus are provided for detecting and indicating the occurrence of such tuning errors.

The advantages of the present invention are preferably attained by detecting and sensing the magnitude of predetermined frequencies outside the standard VOR modulation spectrum transmitted by VOR ground stations which are found to have greater relative magnitudes within the VOR receiver under a mistuned condition than under a properly tuned condition, and activating a flag monitor circuit or the like in response to occurrence of said predetermined frequencies at magnitudes exceeding a preselected threshold value. It has been found that this may be accomplished simply, reliably, and economically. Moreover, apparatus embodying the present invention can be retrofit quickly, easily, and inexpensively on airborne VOR receivers of the prior art.

Accordingly, it is an object of the present invention to provide improved VOR receivers.

Another object of the present invention is to provide methods and apparatus for detecting and indicating improper tuning of VOR receivers.

An additional object of the present invention is to provide apparatus for detecting and indicating improper tuning of VOR receivers, which apparatus is simple and economical, yet is highly reliable.

A further object of the present invention is to provide apparatus for detecting and indicating improper tuning of VOR receivers, which apparatus may be retrofit on prior art VOR receivers quickly, easily, and economically.

A specific object of the present invention is to provide methods and apparatus for detecting and sensing the magnitude of predetermined frequencies outside the standard VOR modulation spectrum transmitted by VOR ground stations, which are found to have greater relative magnitudes within the VOR receiver under a mistuned condition than under a properly tuned condition, and activating a flag monitor circuit in response to occurrence of said predetermined frequencies at magnitudes exceeding a preselected threshold value.

These and other objects and features of the present invention will be apparent from the following detailed description taken with reference to the figures of the accompanying drawing.

Figure 2:
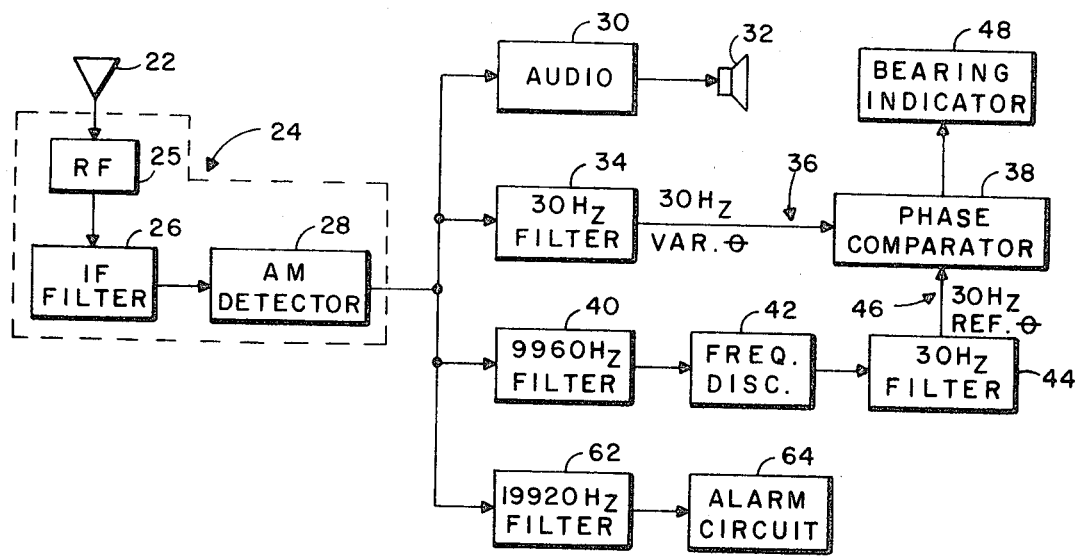

In the drawing:

FIG. 1 is a diagrammatic representation showing the spectral output of a VOR ground station and the relation thereto of the IF filter passband of an airborne VOR receiver mistuned by 50 kHz; and FIG. 2 is a block diagram of an airborne VOR receiver embodying the present invention.

In that form of the present invention chosen for purposes of illustration, FIG. 1 shows the spectral output typically transmitted by a VOR ground station. This spectral output consists of a carrier 2 having 30 Hz sidebands 4 which result from amplitude modulation onto the carrier 2 to provide a 30 Hz variable phase signal; harmonics of this 30 Hz modulation, not shown; 9,960 Hz subcarrier sidebands 6 with associated sub-sidebands, which result from amplitude modulation onto the carrier 2 and which are frequency modulated to provide a 30 Hz reference phase signal; and harmonics of the 9,960 Hz subcarrier with sidebands. The carrier 2 may be voice-modulated and carries the Morse code station identification signal. As seen, the second harmonic of the 9,960 Hz signal and its associated sidebands is indicated at 8 in FIG. 1. Similarly, the third harmonic is indicated at 10; the fourth harmonic is indicated at 12; the fifth at 14, the sixth at 16, the seventh at 18, etc. The relative magnitudes of the various components of the spectral output are indicated, generally, by the length of the respective symbols above the base line 20. The carrier 2, together with the 30 Hz sidebands 4 and 9,960 Hz subcarrier 6, constitute the standard VOR modulation spectrum.

FIG. 2 is a block diagram of an airborne VOR receiver having an antenna 22 which supplies signals to a receiver 24 that includes an RF section 25, an IF filter 26 and an AM detector 28. The detector 28 demodulates the carrier, indicated at 2 in FIG. 1, and passes the Morse code station identification signal and any voice-modulation to a suitable audio circuit 30 which applies them to the cabin speaker 32 or pilot's earphones. The 30 Hz amplitude-modulated sideband signals, indicated at 4 in FIG. 1, are passed through 30 Hz filter 34 to provide a variable phase input 36 to phase comparator 38. The 9,960 Hz frequency-modulated subcarrier, indicated at 6 in FIG. 1, is passed through 9,960 Hz filter 40 and is demodulated by a frequency discriminator 42 which recovers the 30 Hz FM signal impressed thereon and passes this through 30 Hz filter 44 to provide a reference phase input 46 to phase comparator 38. The phase comparator 38 compares the phases of the inputs 36 and 46 and derives a bearing signal which is applied to the bearing indicator 48.

However, as is well known, all radio receivers actually detect a band of frequencies centered about the frequency to which the receiver is tuned. This band of frequencies is referred to as the "passband" and is indicated by the area under curve 50 in FIG. 1. The width of the passband, indicated by the flat portion 52 of curve 50, and the slope of the "cutoff," indicated by portions 54 of curve 50, are determined by the filter circuits of the receiver. Signals at frequencies within the flat portion 52 of passband 50 are passed with minimum attenuation, while the attenuation increases rapidly for frequencies in the "cutoff" portions 54. However, it must be understood that the existence of passband 50 is inherent in all radio receivers. Moreover, as indicated by flared portions 56 of curve 50, the attenuation can never be perfect. Thus, the passband of a typical airline-quality VOR receiver may provide 6 db attenuation for signals having frequencies within 25 kHz of the selected frequency, while the attenuation increases to 60 db for signals 45 kHz from the selected frequency and to 80 db for signals 75 kHz from the selected frequency. In the situation where there are actually two geographically adjacent VOR ground stations transmitting signals at a frequency spacing of 50 kHz, no problem will arise since the carrier of the non-selected station will be attenuated approximately 60 db below the carrier of the selected station and the automatic gain control of the receiver will cause the receiver to "ignore" the non-selected signal in favor of the selected or "on-channel" signal. If the receiver has inadvertently been tuned to the wrong station, the pilot can readily determine this by listening to the identification code and can retune the receiver to the frequency of the proper station.

However, the problem discussed above arises in the situation where the receiver is accidentally mistuned 50 kHz from the frequency of the desired VOR ground station and no station is transmitting on the incorrect frequency to which the receiver has actually been tuned. This condition is indicated by arrow 58 in FIG. 1. When this occurs, as seen in FIG. 1, the improperly selected frequency, indicated at 60, substantially coincides with the fifth harmonic 14 of the 9,960 Hz subcarrier 6 and the third, fourth, fifth, sixth, and seventh harmonics will appear within the receiver passband 50, as seen at 10, 12, 14, 16, and 18; while the second harmonic 8 appears on the cutoff slope 54 of the passband 50. Since no VOR ground station is actually transmitting on the inadvertently selected frequency 60, the automatic gain control of the receiver 24 will be controlled by that signal within the passband 50 having the greatest magnitude; in this instance, the third harmonic 10 of the 9,960 Hz subcarrier 6 will appear. Hence the receiver 24 will misinterpret the third harmonic 10 to be the carrier 2 and, since they are appropriately spaced from the third harmonic 10, the second harmonic 8 and fourth harmonic 12 will be misinterpreted by receiver 24 as being the 9,960 Hz fundamental 6. Moreover, because of their magnitudes and the ultimate rejection limitations of the IF filter 26, indicated by flared portions 56 of curve 50, significant components of the true carrier 2 and of the 9,960 Hz fundamental 6 will be detected. This component of the true carrier 2 will be demodulated by the AM detector 28 and will be applied to audio circuit 30 and speaker 32, causing the pilot to hear the Morse-code identification of the desired station despite the mistuned condition. Since receiver 24 has misinterpreted the third harmonic 10 to be the carrier, the second and fourth harmonics 8 and 12 will be amplitude demodulated against the third harmonic 10 and will be passed through 9,960 Hz filter 40, be frequency-demodulated by discriminator 42, and be passed through 30 Hz filter 44 to provide a 30 Hz reference phase input 46 for phase comparator 38. At the same time, since the second harmonic 8 intercepts the cutoff slope 54 of the passband 50, the 30 Hz frequency modulation of the second harmonic 8 causes a variation in attenuation which is erroneously interpreted by the AM detector 28 as a 30 Hz amplitude-modulated signal. Consequently, this factor is passed through 30 Hz filter 34 to the 30 Hz variable phase input 36 of phase comparator 38. However, since this signal is derived from the second harmonic 8, the phases of the two inputs 36 and 46 of phase comparator 38 will always be substantially identical. This will be true regardless of the true bearing to the desired VOR ground station. Moreover, the magnitudes of these signals will generally be well above the threshold values of the "weak signal" flag monitor circuits of the VOR receiver whenever the received RF signal exceeds approximately 1,000 microvolts. Consequently, a situation is presented in which the pilot actually hears the Morse code identification of the desired ground station and the flag monitor circuits indicate that a valid signal is being received, while the bearing information supplied by phase comparator 38 and bearing indicator 48 is completely false.

Fortunately, it has been discovered that the conditions which create the foregoing problem also provide a means for warning the pilot that such a tuning error has occurred. As discussed above, in the mistuned condition, the airborne VOR receiver 24 will detect the third harmonic 10, the second harmonic 8, and a significant component of the 9,960 Hz fundamental 6. This component of the fundamental 6 will be demodulated against the third harmonic 10 to yield a strong signal at 19,920 Hz, which is the same frequency as the second harmonic 8. Thus, in the mistuned condition, the magnitude of the signal at 19,920 Hz will be substantially greater than would be true under correct tuning. Accordingly, a 19,920 Hz bandpass filter 62 is provided in the circuit of FIG. 2, to monitor this frequency and signals passed by filter 62 are supplied to a suitable alarm circuit 64 which triggers an appropriate warning device such as a flag, light, or horn, whenever the magnitude of the signal passed by filter 62 exceeds a preselected threshold value above the magnitude of this signal under correct tuning.

If desired, similar monitor circuits may be provided to sense frequencies outside the standard VOR modulation spectrum other than that at 19,920 Hz; provided that adequate rejection is made of the normal VOR frequencies extending from 30 Hz to 9,960 Hz. The selection of such other frequencies may permit entirely adequate sensor operation solely on "out-of-band" noise. In addition, numerous other variations and modifications may be made without departing from the invention. Accordingly, it should be clearly understood that the form of the present invention described above and shown in the accompanying drawing is illustrative only and is not intended to limit the scope of the present invention.

What is claimed is:

1. The method of detecting adjacent-channel mistuning of a VOR receiver; said method comprising the steps of:
   monitoring a predetermined harmonic of a frequency transmitted by a VOR ground station; and
   activating an alarm when the magnitude of said predetermined harmonic exceeds a preselected threshold value above the magnitude of said predetermined harmonic under correct tuning conditions.

2. The method of claim 1 wherein:
   said predetermined harmonic is a harmonic of the 9,960 Hz subcarrier transmitted by a VOR ground station.

3. The method of claim 1 wherein:
   said predetermined harmonic is the second harmonic of the 9,960 Hz subcarrier transmitted by a VOR ground station.

4. The method of claim 1 wherein:
   said predetermined harmonic is 19,920 Hz.

5. Apparatus for detecting adjacent-channel mistuning of a VOR receiver; said apparatus comprising:
   monitor means monitoring a predetermined harmonic of a frequency transmitted by a VOR ground station, and
   alarm means connected to receive signals from said monitor means and responsive to values of said predetermined harmonic exceeding a preselected threshold value to indicate that mistuning has ccurred.

6. The apparatus of claim 5 wherein:
   said monitor means comprises a bandpass filter passing substantially only said predetermined harmonic.

7. The apparatus of claim 5 wherein:
   said monitor means comprises filter means passing substantially only a harmonic of the 9,960 Hz subcarrier transmitted by a VOR ground station.

8. The apparatus of claim 5 wherein:
   said monitor means comprises filter means passing substantially only signals at 19,920 Hz.

9. The method of detecting mistuning of a VOR receiver; said method comprising the steps of:
   monitoring a predetermined frequency outside the standard VOR modulation spectrum transmitted by a VOR ground station; and
   activating an alarm when the magnitude of said predetermined frequency exceeds a preselected threshold value above the magnitude of said predetermined frequency under correct tuning conditions.

* * * * *